(12) United States Patent
Lainer et al.

(10) Patent No.: US 7,877,474 B2
(45) Date of Patent: Jan. 25, 2011

(54) METHOD FOR GENERATING AND ADMINISTERING TEMPLATES FOR EVENT MANAGEMENT

(75) Inventors: Theresia Lainer, Seligenporten (DE); Hendrik Schade, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1439 days.

(21) Appl. No.: 11/114,260

(22) Filed: Apr. 26, 2005

(65) Prior Publication Data

US 2005/0246720 A1 Nov. 3, 2005

(30) Foreign Application Priority Data

Apr. 29, 2004 (DE) ...................... 10 2004 021 031

(51) Int. Cl.
*G06F 15/173* (2006.01)
*G06F 15/177* (2006.01)
(52) U.S. Cl. ....................... 709/224; 709/221
(58) Field of Classification Search ........................ None
See application file for complete search history.

(56) References Cited

U.S. PATENT DOCUMENTS

| | | | |
|---|---|---|---|
| 5,832,503 A * | 11/1998 | Malik et al. ................. 709/223 |
| 6,490,620 B1 * | 12/2002 | Ditmer et al. ................ 709/224 |
| 6,839,753 B2 * | 1/2005 | Biondi et al. ................ 709/224 |
| 6,938,021 B2 * | 8/2005 | Shear et al. .................... 705/67 |
| 7,075,894 B2 * | 7/2006 | Hein et al. ................... 370/244 |
| 2002/0099571 A1 * | 7/2002 | Waku et al. ..................... 705/2 |
| 2003/0037040 A1 * | 2/2003 | Beadles et al. .................. 707/1 |
| 2003/0172151 A1 * | 9/2003 | Schade ........................ 709/224 |
| 2005/0015624 A1 * | 1/2005 | Ginter et al. ................. 713/201 |

\* cited by examiner

*Primary Examiner*—Michael J Yigdall
*Assistant Examiner*—Ben C Wang
(74) *Attorney, Agent, or Firm*—Brinks, Hofer, Gilson & Lione

(57) ABSTRACT

A method and an apparatus are provided for automatically generating and administering templates for an event management tool, which is configured for monitoring terminal devices or components of a network. In the templates, monitoring criteria, by which the monitoring of one of the components is to be done, are defined. After the automatic generation of the template, this template is automatically tested. An administration module is also provided, which is configured for organizing and administering all the processes with respect to the templates.

17 Claims, 1 Drawing Sheet

METHOD FOR GENERATING AND ADMINISTERING TEMPLATES FOR EVENT MANAGEMENT

FIELD OF THE INVENTION

The present invention relates, generally, to the field of monitoring computer-supported components of a comprehensive system, and more particularly, to event management.

BACKGROUND OF THE INVENTION

In event management, the term "event" means an event to be monitored. The event to be monitored may for instance be a new entry or record in a data file assigned to a particular device, component or piece of equipment. The event may also be used to refer to a capacity utilization of a piece of equipment, or in other words, is directed to a question of how many processing requests are made for a limited resource at a certain time.

Which parameters or data the event to be monitored relates to may depend for one on a current task or instruction and for another on the component or piece of equipment to be monitored.

A type and orientation of the monitoring may also differ. For instance, the event management may be used for a configuration and sequencing and/or error behavior of the system and/or of individual components of the system.

Typically, the components to be monitored are part of a network, which typically includes various kinds or generic types of components. In a medical network, for instance, such types of equipment as CT (Computed Tomography), MRI (Magnetic Resonance Imaging), and X-ray systems, and the like are provided, which each have different events of interest. A plurality of templates may therefore exist for a plurality of types of components.

In event management, a change of state of the monitored component that is to be detected and observed is typically defined. Different events may also be provided for one and the same component at different times.

Typically, the monitoring is done with a substantially narrow time-interval pattern, so that the component is monitored nearly continuously.

Depending on the application, from a set of events, a partial set can be formed, the so-called events of interest. These events of interest are typically relevant to a particular application and may vary from one application to another.

For investigating the question of whether an event to be monitored or an error has occurred or not, specific devices are employed, such as sensors, which either belong to the monitored component or are assigned to it. In the latter case, an occurrence of an event in the monitored component can also be ascertained outside the component and is executed via a so-called external agent.

The external agent is preferably a software module that takes on monitoring tasks. However, in some applications, the external agent may be appropriately entrusted with other tasks as well. This agent is typically assigned to a terminal unit to be monitored or to the component to be monitored and receives the assigned tasks and executes them at forwarded times or within a defined time interval.

In some cases, ascertaining or detecting the event exactly at the instant when it also occurs in the component may be desired, or in other words performing real-time monitoring. In other cases, performing the monitoring chronologically separately from or offset from the occurrence of the event may be appropriate.

An outcome of the monitoring is an event report. Depending on the application, the information and parameters that the event report should include can be defined, such as the type of event, priority, time of occurrence of the event, status of the component before and/or after the occurrence of the event, and so forth. Typically, the event report is prepared at the monitored component and forwarded to a central authority, preferably an event management station. This station administers all the event reports received and can take on still other control tasks as well. Typically, the event management station includes a graphic user interface.

The events of interest are defined for a particular component to be monitored in so-called templates (also called document templates). The templates include tasks for monitoring the component or terminal unit. Typically these tasks search for specific text strings in data files (such as an error report in a specific log file) and/or polling of hardware-specific parameters of the terminal unit (for instance on the order of "switch in open or closed position (ON/OFF position)" or "connection does/does not exist"). Once the template for the component has been generated, the component or the corresponding external agent is configured with the template so that the events of interest can be detected. If a setting changes in the terminal unit (for instance, if a new software version is installed or downloaded), then the template pertaining to this unit must be suitably adapted or modified. This adaptation or modification is done manually. This manual adaptation has the disadvantage that the risk of error increases, since the user may overlook the adaptation or modification or forget to do it or may perform it erroneously.

Moreover, in complex systems with various types of terminal units and manifold uses, the monitoring task is necessarily also more complex. As such, generating, maintaining and administering the templates to be monitored involve a great deal of work. Even slight changes in a terminal unit may still require major adaptation of the templates. The templates may need to be continuously maintained so that a monitoring system that operates without error can be assured. These required or desirable adaptations and continuous maintenance make increased demands of an event management tool. As such, the user may desirably be supported as extensively as possible in his work with the event management tool.

Moreover, there has been a disadvantage that upon a change of event management tool, all the old templates created thus far must be discarded, since they can no longer be used for the new tool. This discarding of old templates requires additional repeated development work.

OBJECT AND SUMMARY

The present invention is defined by the appended claims. This description summarizes some aspects of the present embodiments and should not be used to limit the claims.

Desirably one may provide a preceding or base module, which can detect the monitoring parameters and know-how for the terminal units in a standardized way, so that all the data necessary for the event management have to be detected only once and for all and need not be input repeatedly upon a new change of tool. A method with which not only generating and testing but also administering and preferably changing and maintaining templates for event management can be simplified, repeated detection can be avoided, and the risk of error moreover can be markedly reduced.

The method is provided for generating and administering templates for event management of at least partly different components of a computer-supported system, in which in the templates at least one monitoring criterion for monitoring the various components is defined, and in which the method runs automatically, and in particular the generation and administration of the templates can be fully automated.

The user is well supported not only in creating the template but also in the use and maintenance and administration of the template, since central tasks now proceed in automated form, and thus the risk of error can also be reduced markedly.

The data relevant to the creation of the templates no longer has to be input manually and from one case to the next; instead, as structured input data, they can be automatically loaded and read in.

The user is supported in repair, maintenance, and administration of the templates because a plan is furnished according to which all the modifications, adaptations, and initial creations of the templates are automatically recorded. Manually documenting changes in the templates, as was previously necessary, is now no longer required. On the contrary, the newest version of the template is now always displayed to the user, and he can, as needed, additionally have all the versions, or an arbitrary selection of old versions of the templates, displayed. As such, a database is provided in which all the relative data are stored in memory.

Accordingly, the administration of templates includes modifications, in particular adaptations and/or maintenance of the templates.

A process of the generation of templates is provided that includes testing that these newly generated templates are error-free. Typically, the testing is effected automatically. However, the user, via a specific user interface furnished, can choose to add testing or not on a case-specific basis, or can determine the type, number and/or duration of the test. This selective testing substantially increases the security of the entire system.

The testing may be based on at least one or more, or a combination, of the following three tests:

1. In a matching test, the template generated is tested on the basis of a reference file that contains all or some of the errors that are fundamentally possible. The reference file is created by simulating the fundamentally possible error situations in the equipment to be monitored. From that, a data structure is then generated, preferably in the form of a list, in which the possible error situations are stored. The template generated is then tested using this file, by investigating whether the template also finds the applicable error, or in other words whether for all the errors there is a match on the basis of the template. If so, then it is assured that the template is functioning without error. If not, a change must be made in the template.

2. In an occurrence test, a hit frequency or rate of the template per unit of time is detected and adapted to predefined specifications. This occurrence test is used for cases in which an error, once found, may not be appropriately looked for and found and reported again and again at later times. For instance, if the hard drive of a CT is full, this leads to an error report. However, it is not expedient for this error report to be displayed at every monitoring operation, and hence at far too short time intervals (for instance, every minute). Therefore, this error report is appropriately displayed only after predeterminable time intervals, so as not to overload the system with excessive error reports.

3. In a tuning test, an optimal monitoring outcome can be set, based on prioritization of the monitoring criteria defined in the template—by changing the chronological order or working through the search or monitoring criteria in the template. That is, search or monitoring criteria with an expected low occurrence frequency are worked through preferentially and chronologically before search or monitoring criteria that from statistical analysis have a high occurrence frequency.

The quality of monitoring and of the event management tool can be increased significantly by performing the aforementioned test now in standardized and complete form—rather than as before, in methods of the prior art, manually and in a way that can be done only with random samples.

Monitoring or event monitoring is effected directly at the component to be monitored or indirectly via an agent at the component to be monitored. In the latter case, a detection module (for instance, in the form of a sensor) is spatially independent and also decoupled in other ways from the equipment to be monitored, so that a change in the equipment need not necessarily lead to an adaptation at the agent. In this latter case, an agent can also be used for a plurality of search and monitoring functions.

As already mentioned, the administration of templates is a central point that if executed poorly or inadequately can greatly impair the quality of the system. The method provided therefore includes an automatic archiving of the templates in which all modifications, or modifications selected as relevant, in a particular template are detected and displayed. This arrangement precludes previous sources of error, particularly errors that have occurred from the failure to perform manual archiving of the templates. Modifications can thus also be completed, since all the adaptations have been carried along or archived.

Advantageously, the method includes reporting, in which the current content of a particular template and/or of all or selected versions of the particular template are displayed.

The provided method includes an optimizing mechanism, in which an adaptation of the particular template is effected on the basis of outcomes of the monitoring, the monitoring operation is thus performed as an iterative process. As such, the outcome of the occurrence test and thus a statement about the frequency of error reports in a unit of time can be employed to adapt the template such that with it, an appropriate, manageable amount of error reports can be generated.

The tuning test may be effected with the aid of a knowledge-based system, in which frequencies of events to be monitored are detected.

An apparatus of the type defined at the outset, in particular an apparatus for generating and administering templates for event management of at least partly different components of a computer-supported system, in which in the templates, at least one monitoring criterion for monitoring the various components is defined, including:
 a generation module, which is intended for automatically generating the templates, in particular with access to a read-in unit which is intended for reading in structured input data;
 a test module, which is intended for automated testing of the generated templates for freedom from error;
 an administration module, which is intended for automated administration of the generated and/or tested templates, in particular for executing and detecting modifications in the templates, and for maintenance and/or for archiving templates.

The apparatus may include a reporting module, which is intended for showing the current content of the particular template or for showing all or selected versions of the template.

An optimization module may be provided, which is intended for optimizing the monitoring process, by using a monitoring outcome as the basis for an adaptation of the particular template.

The features described above for the provided method may also be implemented as a computer program product, with a computer-readable medium and with a computer program and associated program code means, in which after the computer program has been loaded the computer is made to perform the above-described method.

Alternatively, a storage medium is provided, which is intended for storing the above-described, computer-implemented method and is readable by a computer.

Illustrative and exemplary embodiments of the invention are described in further detail below with reference to and in conjunction with the figures.

DETAILED DESCRIPTION

A system comprises a plurality of generic types or different types of terminal units or components to be monitored. In a medical technology context, these include X-rays, CTs and/or MRIs. Depending on the type of component, there are different parameters that may be monitored via an event management tool if the system is to have a substantially error-free course. For instance, a specific problem with a radiation source can occur only for equipment with an X-ray source, and only in such equipment is this event to be monitored. Accordingly, different templates V may be provided for different types of components to be monitored.

Figure 1:
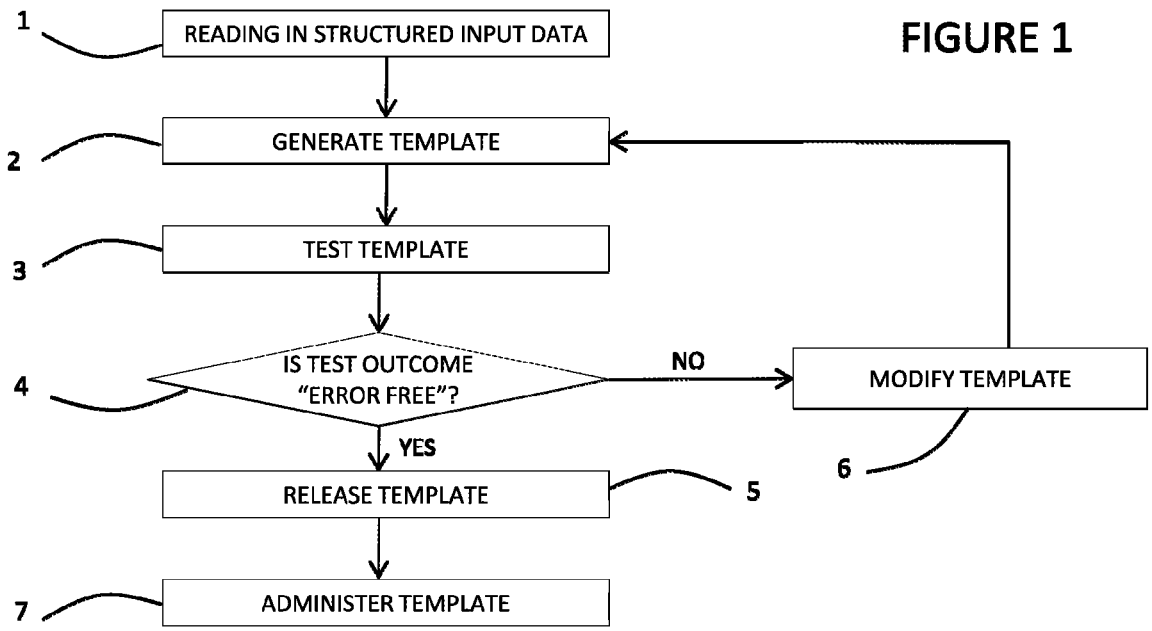
FIG. 1 is a flow chart according to the invention for an embodiment.

Referring to FIG. 1, all the essential input data for the component to be monitored is acquired in structured form via predefined detection modules, at step 1. From these structured input data, a template V is then automatically created, at step 2, which is tested in a step that substantially immediately ensues, at step 3. At step 4, if the testing shows that the generated template V substantially functions without error and can identify the possible errors in the component, then the template V is released, at step 5, and can be employed in the context of the event management tool, at step 7. If not, at step 6, the template V is modified again and improved and then tested again in a new version. This cycle continues until it is assured that the template V is functioning without error.

The method provided can be broken down into two fundamental portions or steps. The first step is generating the templates V, which includes testing, possibly changing, optimizing, and a release. The second step is administration. Administering a template V can naturally not be done until the template has been generated. Fundamentally, however, the administration process must be understood as a higher-ranking operation and can also be done simultaneously with the generation of a different or new template V.

All the operations with reference to a template V, such as initial creation, adaptation, and/or modification are automatically archived and administered. This automated archiving and administering process has the advantage that these operations can still also be completed at a later time.

The process of administering the templates V is to be understood as a general organization with respect to the templates. Various versions, adaptations, modifications, deletions, and other changes in a particular template V are automatically detected. It is thereby assured that the requisite amount of information is preserved in the system, and errors are avoided, since earlier versions can always be accessed.

The process of testing is based on three fundamental principles:

1. Match test: This test monitors the generated templates V for freedom from error, by testing the template V against a list, or so-called reference file that substantially contains all or some of the possible error situations. After the match test, the template V is considered error-free if the template finds all the error entries in the list or identifies them. If any entries and hence error situations are "left over", then the generated template V is defective and will be adapted or modified.

2. Occurrence test: This test addresses the question of how often a monitoring rule, if an error occurs, should output an error report or write it into a log file. The test aims at guarding the system against unnecessarily frequently repeated error reports. For instance, if the system is configured such that a data exchange connection between the terminal unit to be monitored and the event management tool is made only in the event of an error, then it is not expedient, and can cause grave subsequent errors. Errors are caused, for example, if in the event of an only slight error (for instance, memory fragmentation of the terminal unit was not performed within the time interval provided for it) for this error report to be transmitted so often that the data exchange connection exists permanently. That would overload the event management tool and would mean that other highly relevant error reports might no longer be correctly processed. Accordingly, the occurrence test is therefore provided, which defines the period of time within which the various matches are to be processed so that in total, the number of matches is appropriate and manageable.

3. Tuning test: This test is based on calculations or statements of likelihood of the occurrence of an event or of a particular error. If this likelihood and hence the number of matches in the search criterion is high, then the error is less relevant; however, if the likelihood is low and hence the number of matches for the search criterion is also low, this may be a highly relevant error, which must fundamentally be worked through before the less-relevant error reports or matches. Accordingly, a classification of relevance of the individual search criteria takes place, with the goal of enhancing the performance of the system, since what is more important is processed before what is more unimportant.

Figure 2:
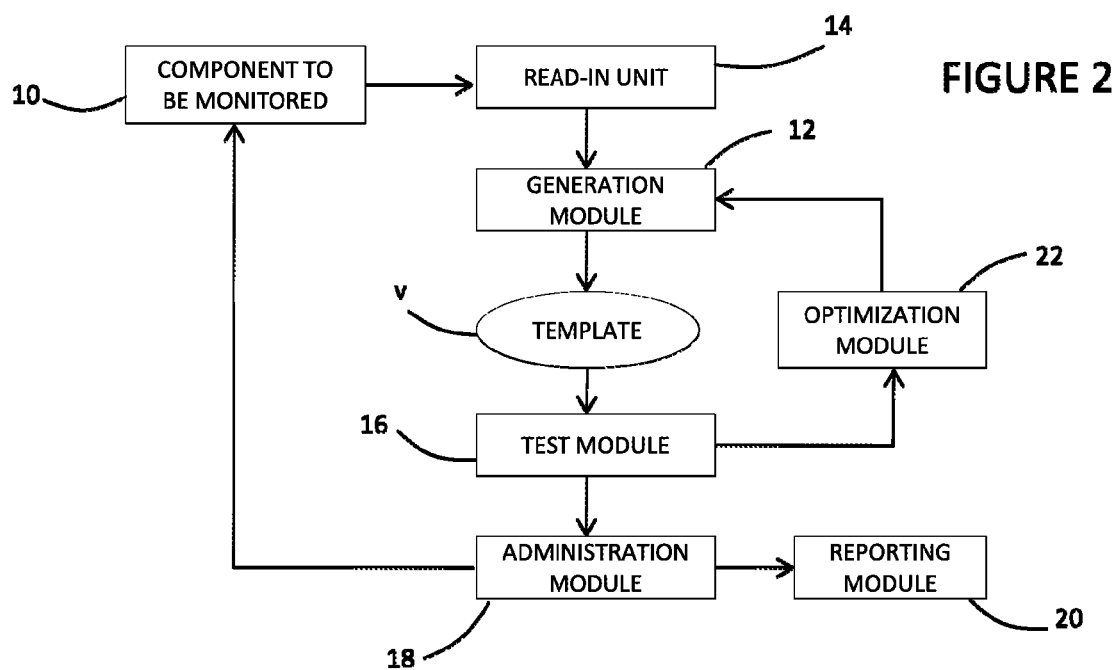
FIG. 2 is a diagram of components of one embodiment of FIG. 1.

FIG. 2 describes the essential components of the provided apparatus. Based on the component 10 to be monitored, the data relevant for the monitoring are acquired in a read-in unit 14, so that for later method steps they are available in structured form. These structured data are then delivered to a generation module 12, which on the basis of these data automatically creates a template V. This generated template V is then automatically subjected to test runs of a test module 16, on the principles described above. In the event of found error, the template V is returned to the generation module 12 for modification. This arrangement advantageously covers cases in which a typographical error has occurred in the template V. Otherwise, the template V can be released and is delivered to the administration module 18 for administering.

Further, manual modifications can still be provided, to give the user additional flexibility.

Advantageous features additionally provide a reporting module 20, which interacts with the administration module 18 and acts as an interface for the user, so that the user can receive conclusive information about the templates V and in particular its current status. Alternatively, the reporting module 20 may be in data exchange communication with individual modules or all the other modules of the system. Whether a report is to be made for basically all events, or only for events selected as relevant, can be optionally decided upon.

Alternatively or cumulatively, an optimization module 22 may be additionally provided, which is in data exchange communication with at least the generation module 12 and the test module 16. The optimization module 22 is designed such that the outcomes of the tests, in particular of the occurrence test, are used to further optimize the generated template V from the standpoint of performance aspects, so that the template V generates a manageable amount of matches.

In another advantageous feature, a generator that operates in partly randomized fashion also generates test log files in automated form. The generator accesses the generated templates V and/or the structured input data.

With the automated generation of templates, another advantage is that different system management tools from different vendors can also be supported. Version management of templates is also supported, since the modifications and versions of a template V are automatically detected or acquired and thus can still be completed even at a later time.

The invention claimed is:

1. A method for generating and administering template for event management of a plurality of at least partly distinct medical components of a computer-supported system, the method comprises:

defining in the templates at least one monitoring criterion for monitoring at least one of the medical component, the template identifying a first plurality of potential errors in the medical components; and automatically generating and administrating the template;

wherein the act of generating the templates further comprises testing generated template for error automatically and match testing the generated template with a reference file that contains a second plurality of potential errors in the medical components, wherein the reference file is created by simulating possible error situations in the medical components, wherein the template is error-free if the first plurality of potential errors are found in the reference file and the template is used for monitoring the operation of the medical component; and wherein the generated template is adapted or modified, if there are errors.

2. The method according to claim 1, wherein the act of generating template further comprises:

reading in structured input data.

3. The method according claim 1, wherein the act of testing the generated template further comprises at least one or a combination of the following acts:

detecting and adapting a hit frequency of the template on a per unit of time basis to predefined specifications; and setting an optimal monitoring outcome based on a prioritization of the monitoring criteria defined in the template.

4. The method according to claim 3, wherein the tuning act is effected with a knowledge-based system in which frequencies of events to be monitored are detected.

5. The method according to claim 1, wherein the act of administrating is effected directly at each of the medical components to be monitored or indirectly via an agent at each of the medical components to be monitored.

6. The method according to claim 1, further comprising:
archiving automatically the template in which all modifications, or modifications selected as relevant, are detected and displayed.

7. The method according to claim 6 further comprising:
displaying a current content of the template and/or all or selected versions of the template; and
optimizing a monitoring process such that adaptation of the template is effected on the basis of outcomes of the monitoring.

8. The method according to claim 1, further comprising:
displaying a current content of the template and/or all or selected versions of the template.

9. The method according to claim 1, further comprising:
optimizing a monitoring process such that adaptation of the template is effected on the basis of outcomes of the monitoring.

10. The method according to claim 1 wherein the act of administrating comprises modifying the template.

11. The method according to claim 1, wherein the act of generating template further comprises:
reading in structured input data; and testing the generated template for error.

12. The method according claim 1, wherein the act of testing the generated template further comprises:
displaying an error report at a pre-determined time interval larger than a monitoring time interval.

13. The method according claim 1, wherein the act of testing the generated template further comprises:
defining a plurality of time intervals for a plurality of matches so that a total number of matches is manageable.

14. A monitoring system comprising a plurality of at least partly different medical components and an apparatus for generating and administering templates for event management of the medical components, wherein monitoring criterion for monitoring the various medical components is defined in the templates, said apparatus comprising:
a storage medium having stored a computer-implemented program, the program comprising;
a generation module configured to automatically generate the template that identifies a first plurality of potential errors in the medical components, the generating module having access to a read-in unit for reading in structured input data;
a test module configured to automatically test the generated template for error, the test comprising match testing the generated template with a reference file that contains a second plurality of potential errors in the medical components; and
an administration module configured to automatically administer the generated and/or tested template, configured to execute and detect modifications in the template and configured to maintain and/or for archive the template, wherein the reference file is created by simulating possible error situations in the medical components, wherein the template is error-free if the first plurality of potential errors are in the reference file and is administered by the administration module where error-free; and wherein the template is adapted or modified if there are errors.

15. The system according to claim 14, wherein said apparatus further comprising a reporting module configured to provide a current content of the template or configured to provide all or selected versions of the template.

16. The system according to claim 14, wherein said apparatus further comprising an optimization module configured to use a monitoring outcome as a basis for an adaptation of a the template.

17. The system according to claim 16, wherein said apparatus further comprising a reporting module configured to provide a current content of the template or configured to provide all or selected versions of the template.

* * * * *